United States Patent [19]

Le Touche

[11] Patent Number: 4,814,371
[45] Date of Patent: Mar. 21, 1989

[54] HEATSHIELD MATERIAL

[75] Inventor: Roger A. L. Le Touche, Ecquevilly, France

[73] Assignee: Aerospatiale Societe Nationale Industrielle, Paris, France

[21] Appl. No.: 944,962

[22] Filed: Dec. 22, 1986

[30] Foreign Application Priority Data

Dec. 24, 1985 [FR] France ............... 85 19145

[51] Int. Cl.$^4$ ........................... C08K 3/38; C08K 3/36
[52] U.S. Cl. .................... 524/405; 524/437; 524/493
[58] Field of Search ............... 524/405, 437, 493

[56] References Cited

U.S. PATENT DOCUMENTS

| | | |
|---|---|---|
| 3,397,168 | 8/1968 | Kramer et al. . |
| 3,868,346 | 2/1975 | Merrill ................... 524/405 |
| 3,933,712 | 1/1976 | Vanagland, Jr. ......... 524/405 |
| 3,945,962 | 3/1976 | Clark ....................... 524/405 |
| 4,289,680 | 9/1981 | Kimura ................... 524/405 |
| 4,320,044 | 3/1982 | Nakamura ............... 524/437 |
| 4,482,111 | 11/1984 | Le Touche ............... 428/921 |
| 4,592,950 | 6/1986 | Le Touche ............... 428/284 |
| 4,683,157 | 7/1987 | Mosser et al. ............ 428/450 |

FOREIGN PATENT DOCUMENTS

| | | | |
|---|---|---|---|
| 759529 | 5/1967 | Canada ................... | 524/493 |
| 0073688 | 3/1983 | European Pat. Off. ... | 428/291 |
| 2061509 | 6/1971 | France . | |
| 1136558 | 6/1986 | Japan ...................... | 524/405 |
| 1220686 | 1/1971 | United Kingdom ..... | 524/493 |
| 1267158 | 3/1972 | United Kingdom . | |
| 1498177 | 1/1978 | United Kingdom . | |

Primary Examiner—John C. Bleutge
Assistant Examiner—David W. Woodward
Attorney, Agent, or Firm—Browdy and Neimark

[57] ABSTRACT

A heatshield material comprises a material of low density and high surface area per unit weight. This material is able to fix by chemical means free water molecules. It is also adapted to permit superheating of steam produced from this free water in response to thermal attack. The material is intimately mixed with at least one non-combustible binder and at least one source of the free water molecules or a substance supplying the free water molecules.

7 Claims, 3 Drawing Sheets

HEATSHIELD MATERIAL

BACKGROUND OF THE INVENTION

1. Field of the invention

The present invention concerns a material directly usable as a heat protection or dissipation shield.

This material is of particular benefit by virtue of the phenomenon of hydration and superheating that occurs within it during thermal attack.

2. Description of the prior art

Various known devices and methods for implementing heat protection or dissipation shields based on this phenomenon are designed to protect objects which have to resist for relatively long periods thermal attack that can be extremely intense (such as a fire or other thermal phenomenon corresponding to temperatures that can exceed 2,000° C.).

There has already been proposed a heat dissipation shield comprising between two walls respectively called the hot wall and the cold wall a layered hydrating element in contact with the cold wall, a layered superheating element between the hydrating element and the hot wall, and a layered porous refractory element between the superheating element and the hot wall, and the latter being formed with orifices to enable the saturated steam developed within the hydrating element when the shield is functioning and superheated during its passage through the superheating element to escape to the exterior of the hot wall (French patent No. 69.05203).

With a heatshield of this kind it is possible to provide effective thermal protection for temperatures not exceeding the temperature at which the liquid contained in the hydrating agent vapourizes throughout the period of vapourization without any increase in pressure (for example: 100° C. in the case of water at the standard atmospheric pressure of one bar) throughout a time period directly proportional to the quantity of this liquid contained in the hydrating element.

As is hardly surprising, a heatshield of this type can only be used under specific circumstances and in specific quantities.

There is also known a heatshield consisting primarily of a flexible material in the form of an array or mat of fibers serving as a support or armature for a powder material capable of absorbing and retaining a liquid to yield a paste or gel that is highly thixotropic, this hydrating/superheating element evolving in the presence of the liquid from the hydrating function towards the superheating function as the thermal attack proceeds. The manufacture of a heatshield of this kind entails disposing the hydrating/superheating element between two flexible coating elements, one intended to be in intimate contact with the surface of the object to be protected and the other constituting the outside surface of the heatshield (U.S. Pat. No. 4,482,111), these two coating elements serving also as sealing skins providing resistance to aging in a normal environment.

The manufacture of a heatshield of this kind therefore has to take account of this aging phenomenon and consequently the sealing material makes an important contribution to the effectiveness of the finished product.

Finally, there has already been proposed a thermal protection or dissipation shield offering a more extended range of protection or stabilization temperatures for the object to be protected and significantly increasing the duration of such protection, temperature stabilization being effected at different and decreasing levels from the hot surface (the area exposed to thermal attack) towards the cold surface delimiting the area to be protected.

A screen of this kind comprises a composite assembly also including a hot wall and a cold wall and between these two walls at least two adjacent vaporizing/superheating elements in a flexible, rigid or stiffened material each containing within it a substance capable of releasing at a temperature specific to each element a non-inflammable gas or vapor, each element being separated from the other by a flexible or rigid wall that is sealed at the temperature at which steam or gas is released from the element nearest the hot wall but adapted to become porous immediately this temperature is exceeded, this element—because of the presence of said substance—evolving from the "vaporizing" function towards the "superheating" function as the thermal attack to which it is subjected proceeds (U.S. Pat. No. 4,592,950).

In this latter type of shield it is equally necessary to use sealing skins. This constraint may be prejudicial in numerous applications.

The present invention therefore proposes a material directly usable as a thermal protection or dissipation shield without any other modification than forming to shape and with no additional conditions as to packaging or storage concerning sealing.

SUMMARY OF THE INVENTION

The present invention consists in a heatshield material comprising a material of low density and high surface area per unit weight able to fix by chemical means free water molecules and adapted to permit superheating of steam produced from said free water in response to thermal attack intimately mixed with at least one non-combustible binder and at least one source of said free water molecules or a substance supplying said free water molecules.

The material in accordance with the invention as defined hereinabove may assume any required shape such asplates, tubes, etc.

Figure 1:
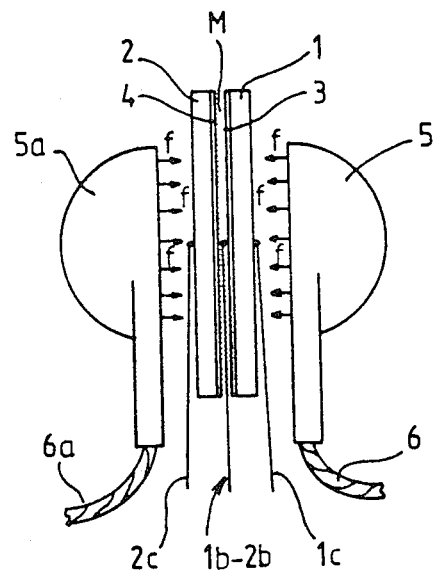
FIG. 1: Illustrates the infra-red heating device used in testing.

Advantageously:

the material of low density and high surface area per unit weight is a silica (silicon dioxide) with chemically stable silanol (SiOH) groups on its surface, obtained for example by pyro-hydrolysis of silicon tetrachloride in an oxygen-hydrogen flame; to be more specific, said material has a surface area per unit weight of at least 300 $m^2/g$ and a particle size such that, for this surface area per unit weight, it comprises approximately $10^{17}$ particles per gram; also, the surface silanol (SiOH) groups are chemically stable up to temperatures in the order of 250° C.;

the binder is non-combustible at high temperatures and when exposed to flame; the binder, which may naturally be water, is preferably chosen from the group comprising resins that can be vulcanized at temperatures below 30° C.; a silicone resin that can be vulcanized is chosen for preference;

the substance providing the necessary water molecules is chosen from the group comprising substances known to have a high concentration of chemically-bonded water; these include pure decahydrated disodium tetraborate ($Na_2B_4O_7$, 10 $H_2O$) retaining 47.3% by weight of water up to a temperature of 60° C., and alumina hydrate ($AlOH_3$) which retains 33% by weight of chemically fixed water up to a temperature of 215° C.

This list of advantageous substances is not exhaustive. The above two substances have been cited only because they are particularly beneficial, given their high content of water of crystallization.

The material in accordance with the invention may have the following formula, for example:

1 part by volume of the binder,
1 to 4 parts by volume of disodium tetraborate,
0.5 to 2.5 parts by volume of $AlOH_3$,
2 to 5 parts by volume of silica as defined hereinabove.

With this composition it is found that 2 to 5 liters of silica gives 380,000 to 950,000 $m^2$ of free surface area.

With a material in accordance with the invention the superheating phenomenon that occurs in response to thermal attack may be explained in the following way:

The silanol groups serving as means for bonding surrounding water molecules at temperatures exceeding 100° C. constitute a system for superheating the steam without any increase in pressure. The silanol groups condense at around 100° C. and this reaction is entirely reversible up to approximately 250° C., meaning that the superheated product returns to the initial concentration of SiOH on taking up the moisture. This explains the aptitude of this particularly beneficial material for superheating the steam.

The superheating phenomenon is proportional to the exposed surface area of the silica with silanol groups per unit volume of material.

It is to be understood that any other product capable of physically or chemically maintaining the vapor of a liquid at a temperature higher than the vaporizing temperature of this liquid falls within the scope of the present invention.

The following example of one material in accordance with the invention is given by way of purely explanatory and non-limiting example:

EXAMPLE

Materials used for 1 part by volume of RTV 121 silicone (Rhone Poulenc):

decahydrated disodium tetraborate (Prolabo): 3.6 parts by volume, alumina hydrate (OMIA): 2 parts by volume, "Aerosil 380" $SiO_2$ (Degussa) with a specific surface area of 380 $m^2/g$: 3 parts by volume.

Equipment used:

Mixer or mixer-extruder.

The malleable product obtained by mixing the above ingredients with 0.01 parts of RTV 121 B catalyst added is ready for spreading, compression molding or extrusion. The manufactured products will be usable after 24 hours stabilization at ambient temperature (approximatey 20° C.). They will be applied directly onto or around the object to be protected and may be secured in place by any appropriate means (adhesive bonding, for example). No means of packaging for storage are necessary, the finished material being stable in storage for ambient temperatures between −100° C. and +60° C.

Stability may be guaranteed up to 200°0 C. by using only alumina hydrate in the above mixture.

The above formula was used for compression molded plates 10 mm thick that were applied to a 1 mm thick metal film simulating the object to be protected.

Heating tests (simulating thermal attack) using infra-red heat or a propane flame were carried out on two samples symmetrically placed in such a way as to avoid any radiation from the cold sides.

Figure 2:
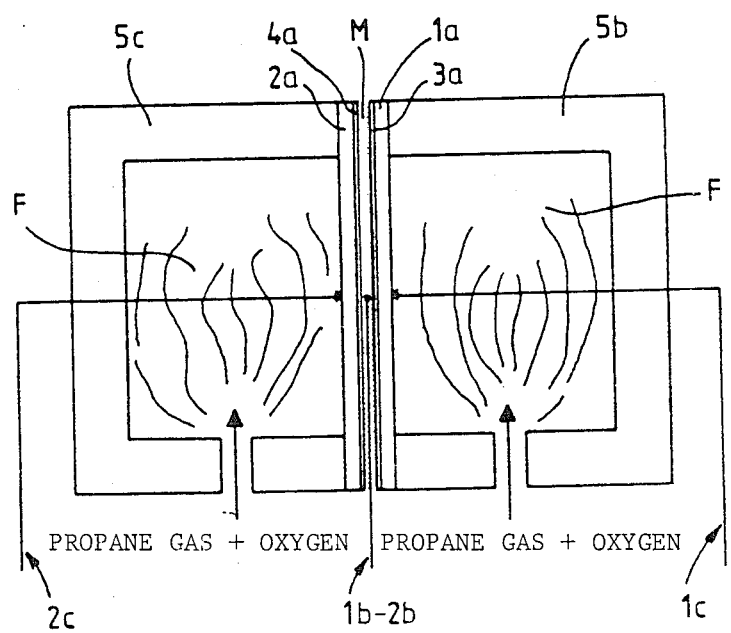
FIG. 2: Illustrates the propane oven used in testing.

The appended FIGS. 1 and 2 illustrate the two types of test: FIG. 1 corresponds to infra-red heating and FIG. 2 to heating in a propane oven.

The two samples 1 and 2 and 1a–2a subjected to the tests were applied to respective metal film plates 3–4 and 3a–4a.

In the case of FIG. 1 the infra-red heat was generated by two devices 5–5a each comprising an electrical power supply 6–6a giving a dual flux of 50 $kV/m^2$ (as illustrated by the arrows f).

For the test heat sensors were placed on the respective hot surfaces 1c and 2c and on the cold surfaces 1b–2b within an appropriate material M for holding them in position.

In FIG. 2 the same elements bear the same reference numbers; heating is carried out in two ovens 5b and 5c fed with propane gas and oxygen, the flames F schematically representing the resulting thermal attack.

Figure 3:
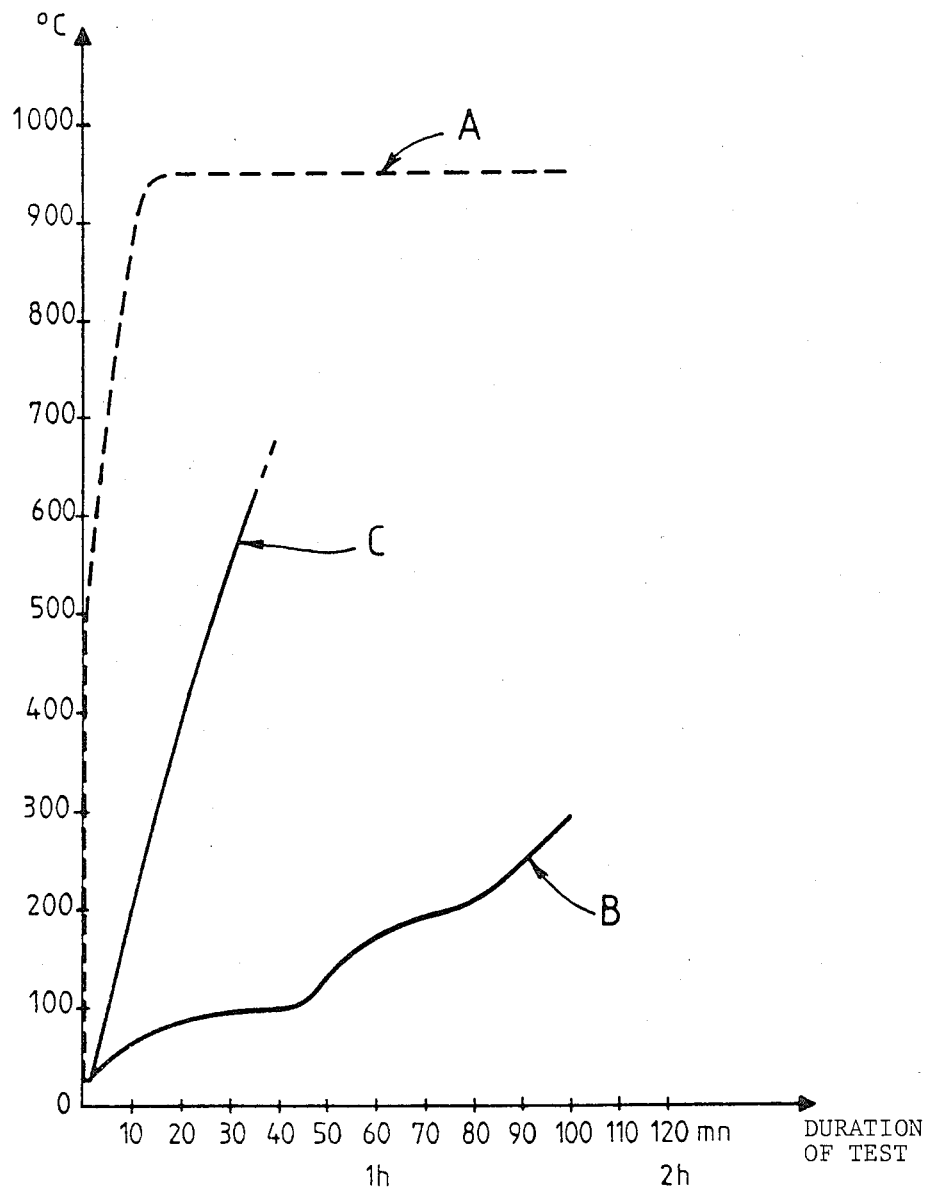
FIGS. 3 and 4 are graphic representation of thermal attack of the inventive composition.
Figure 4:
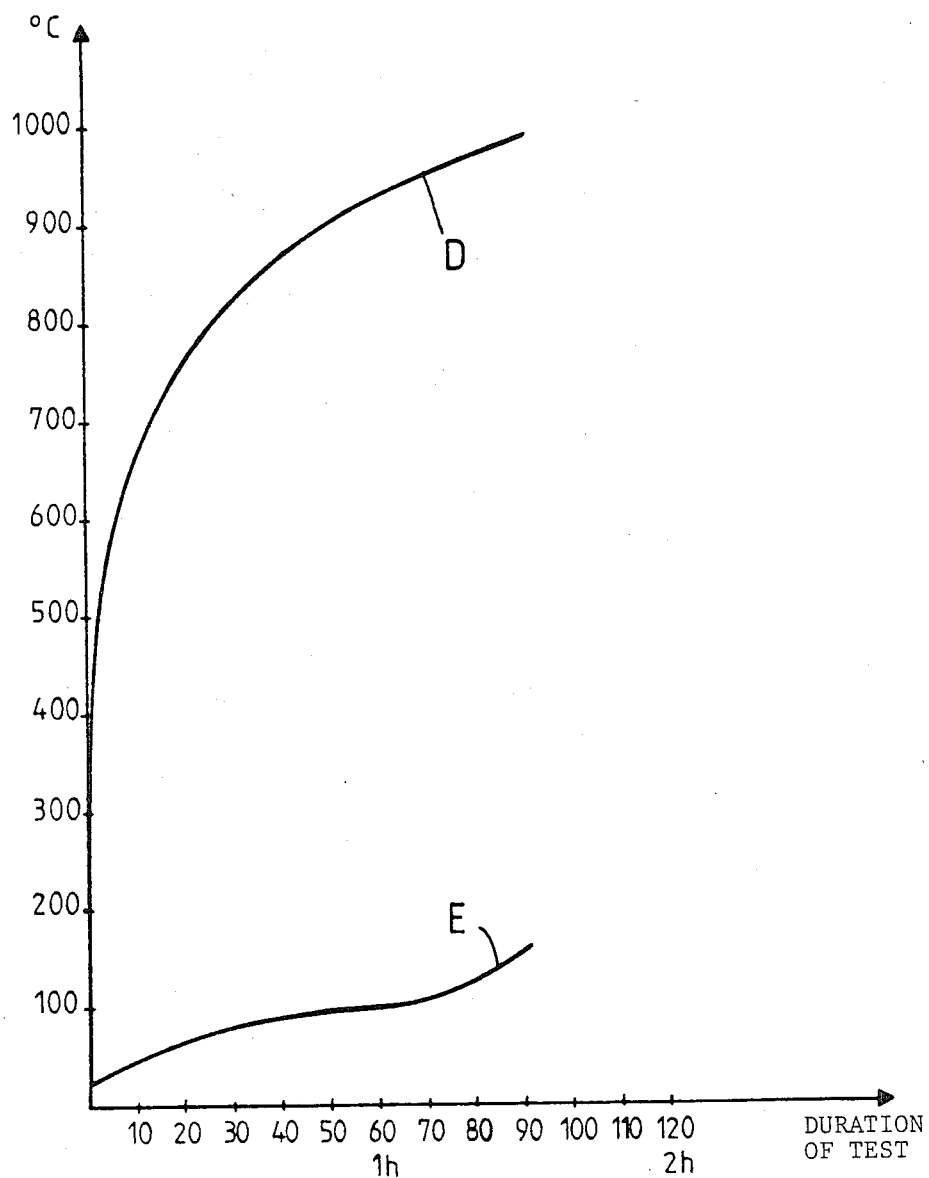

The temperatures of the cold sides are plotted on graphs. These graphs are shown in FIGS. 3 and 4. The horizontal axes show the duration of the test in hours and minutes and the vertical axes show the temperature in C.

FIG. 3 shows three curves, curve A corresponding to the temperature of the hot surfaces, curve B corresponding to the temperature of the cold surfaces using a protective element manufactured using the formula specified above, and curve C corresponding to the temperature of the cold surfaces of samples of a commercial product marketed under the trade name "Kerlane 45" based on ceramic fiber felt. A product of this kind meets the following specifications:

specific gravity: 0.128
composition: $Al_2O_3$—$SiO_2$
specific heat: 1,040 J/kg/K°
thermal conductivity:
200° C.=0.06 W/m/K°
400° C.=0.09 W/m/K°
600° C.=0.12 W/m/K°

These three curves were obtained for infra-red heating.

In FIG. 4 curve D shows the variation in the temperature of the ovens and curve E shows the variation in the temperature of the cold surfaces with exactly the same protection as was used to establish curve B.

These two curves were plotted after the propane oven test.

The curves show that a product in accordance with the invention 10 mm thick evolves from the hydrating function to the superheating function between 100° and 200° C. during a period of thermal attack exceeding one hour. On the other hand, the comparative example (curve C) shows that the temperature of 200° C. was exceeded after only ten minutes.

It is to be understood that these examples have been given by way of purely explanatory and non-limiting example only to show how a heatshield in accordance with the invention behaves in response to thermal attack.

It is also to be understood that the foregoing description has been given by way of purely explanatory and non-limiting example only and that numerous modifications may be made to the material as described without departing from the scope of the invention.

There is claimed:

1. Heatshield material comprising a material of low density and high surface area per unit weight consisting essentially of silica ($SiO_2$) with chemically stable silanol groups (SiOH) on its surface, said silanol groups being chemically and thermally stable up to 250° C., the surface area per unit weight of said silica being at least 300 $m^2/g$, said silanol groups fixing chemical reaction free water molecules to permit superheating of steam produced from said free water in response to thermal attack, and at least two substances having a high concentration of chemically-bonded water and supplying said free water molecules at two different temperatures between about 60° and 215° C., one of said substances being decahydrated disodium tetraborate and the other comprising alumina hydrate, intimately mixed with at least one resinous binder.

2. Heatshield material according to claim 1, wherein said binder is non-combustible at high temperatures and when exposed to flame.

3. Heatshield material according to claim 2, wherein said binder is selected from the group consisting of resins that can be vulcanized at temperatures below 30° C.

4. Heatshield material according to claim 2, wherein said binder is a silicone resin that can be vulcanized.

5. Heatshield material according to claim 1, having the following formula:
   one part by volume of the binder,
   one to four parts by volume of disodium tetraborate ($Na_2B_4O_7.10\ H_2O$),
   0.5 to 2.5 parts by volume of $AlOH_3$,
   two to five parts by volume of silica.

6. A thermal protection or dissipation shield, comprising
   silica having chemically stable silanol groups on its surface, said silica having a surface area per unit weight of at least 300 $m^2/g$, said silica being present in an amount sufficient to fix by chemical means free water molecules and to permit superheating of steam produced from said free water in response to thermal attack;
   a mixture of hydrated borate and alumina hydrate in an amount sufficient to generate free water molecules in response to thermal attack; and
   a resinous binder which is non-combustible at high temperatures and when exposed to flame, said binder being present in an amount sufficient to bind said mixture.

7. A thermal protection or dissipation shield in accordance with claim 6 comprising 1–4 parts by volume of said hydrated borate, 0.5–2.5 parts by volume of said alumina hydrate, and 2–5 parts by volume of said silica.

* * * * *